United States Patent [19]

Yamaguchi et al.

[11] Patent Number: 5,087,231
[45] Date of Patent: Feb. 11, 1992

[54] SUPPORTING STRUCTURE FOR OUTPUT SHAFT OF AUTOMOTIVE TRANSAXLE FOR AUTOMOTIVE VEHICLE

[75] Inventors: Toshio Yamaguchi; Kazuhiko Sugano; Kazuyoshi Iwanaga, all of Kanagawa, Japan

[73] Assignee: Nissan Motor Company, Limited, Japan

[21] Appl. No.: 685,985

[22] Filed: Apr. 15, 1991

Related U.S. Application Data

[63] Continuation of Ser. No. 281,397, Dec. 8, 1988, abandoned.

[30] Foreign Application Priority Data

Dec. 11, 1987 [JP] Japan .................. 62-312348

[51] Int. Cl.⁵ .................................. F16H 37/08
[52] U.S. Cl. ......................... 475/200; 74/606 R
[58] Field of Search ............ 74/606 R; 475/200, 280, 475/281

[56] References Cited

U.S. PATENT DOCUMENTS

| | | | |
|---|---|---|---|
| 4,304,153 | 12/1981 | Moroto et al. | 74/759 |
| 4,315,443 | 2/1982 | Kubo et al. | 74/762 X |
| 4,438,663 | 3/1984 | Eichenberger et al. | 74/761 X |
| 4,484,494 | 11/1984 | Sakakibara | 74/763 X |
| 4,594,914 | 6/1986 | Kubo et al. | 74/730 |
| 4,716,786 | 1/1988 | Sakakibara | 74/695 |
| 4,722,242 | 2/1988 | Miura et al. | 74/606 R X |
| 4,793,210 | 12/1988 | Backsch | 74/695 |
| 4,836,052 | 6/1989 | Iwanaga et al. | 74/758 X |

FOREIGN PATENT DOCUMENTS

| | | |
|---|---|---|
| 0080082 | 6/1983 | European Pat. Off. |
| 0172286 | 2/1986 | European Pat. Off. |
| 58-131449 | 1/1982 | Japan |
| 58-5557 | 1/1983 | Japan ............... 74/763 |
| 2051977 | 1/1981 | United Kingdom |

OTHER PUBLICATIONS

The Way Things Work, vol. 2, pp. 170–173, Copyright 1971.

*Primary Examiner*—Dwight Diehl
*Attorney, Agent, or Firm*—Leydig, Voit & Mayer

[57] ABSTRACT

An output shaft is supported by means of a ball bearing at one end, a radial needle bearing and a thrust bearing. The ball bearing is arranged for supporting the output shaft against most part of radial load. On the other hand, the trust bearing is arranged for supporting the output shaft against the thrusting force which is exerted on the output shaft while the engine driving torque is transferred therethrough. Such construction reduces radial and thrusting stress to be exerted on the needle bearing. Therefore, the radial needle bearing to be used in the shown construction is required substantially small load capacity and thus can be satisfactorily small for allowing the transaxle unit to be designed compact.

4 Claims, 2 Drawing Sheets

SUPPORTING STRUCTURE FOR OUTPUT SHAFT OF AUTOMOTIVE TRANSAXLE FOR AUTOMOTIVE VEHICLE

This application is a continuation of application Ser. No. 07/281,397, filed Dec. 8, 1988 now abandoned.

BACKGROUND OF THE INVENTION

1. Field of the Invention

The present invention relates generally to an automatic transaxle for a power train of an automotive vehicle. More specifically, the invention relates to a supporting structure for an output shaft of an automotive automatic transaxle.

2. Description of the Background Art

One of the typical construction of the supporting structure for the output shaft of an automotive automatic transaxle has been disclosed in "Automatic Transaxle RN4F02A type, RL4F02A type, 1984 Service Manual" (Nissan Motor Co., Ltd), page 10. The shown automatic transaxle has a counter shaft in parallel to the output shaft. The counter shaft is coupled with the output shaft by an output gear integrally formed with or rigidly secured on the output shaft and a counter gear rigidly secured on the counter shaft. The counter shaft is connected to a differential gear mechanism. The output shaft is supported by means of two tapered roller bearings.

Another typical construction of the automotive automatic transaxle has been disclosed in "A240 type AT Explanation", Toyota Motor Co., Ltd. In the latter publication, the output shaft of the automatic transaxle is supported by means of two ball bearings.

In the former case, the tapered roller bearings tend to be subject to substantial load to cause substantial wearing for lowering power transmission efficiency. Furthermore, since the diameter of the tapered roller bearing arranged at the side of the power transmission section is relatively large, it limits arrangement of clutch, brake and other components designed to be arranged therearound.

In the latter case, since the output shaft is supported only by the ball bearings arranged in the vicinity of both ends. In order to provide sufficient bending strength, the ball bearing has to be arranged at approximately even distance from the associated end of the output shaft. This requires substantial length in axial direction of the output shaft. This also limits reduction of the size of the transaxle unit.

SUMMARY OF THE INVENTION

Therefore, it is an object of the present invention to provide a supporting structure for an output shaft of an automatic transaxle, which enables the transaxle unit to be made compact in comparison with that in the known constructions.

In order to accomplish aforementioned and other objects, an output shaft is supported by means of a ball bearing at one end, a radial needle bearing and a thrust needle bearing. The ball bearing is arranged for supporting the output shaft against most part of radial load. On the other hand, the thrust needle bearing is arranged for supporting the output shaft against the thrusting force which is exerted on the output shaft while the engine driving torque is transferred therethrough.

Such construction reduces radial and thrusting stress to be exerted on the radial needle bearing. Therefore, the radial needle bearing to be used in the shown construction is required to have substantially small load capacity than the ball bearing and thus can be smaller size allowing the transaxle unit to be designed more compactly.

According to one aspect of the present invention, an automotive power transmission is provided with:

a housing having an open axial end;

a side cover secured to said housing to sealably close said open end of said housing, said side cover being formed with a generally cylindrical output shaft receptacle including a first cylindrical wall;

an input shaft rotatably supported in said housing;

an output shaft with an integral output gear;

a gear mechanism mounted within said housing and operatively connected between said input shaft and said output shaft;

an output retainer within said housing, said output retainer being secured to said housing and including an axially extending hollowed portion disposed radially inwardly of said gear mechanism, said axially extending hollowed portion including a radially extending wall and a second cylindrical wall;

said output shaft including a radially extending portion formed with said output gear and disposed between said side cover and said radially extending wall of said output retainer, and an axially extending portion received in said generally cylindrical output shaft receptacle and received in said hollow axially extending portion of said output retainer, said axially extending portion of said output shaft including a first circular surface opposing said first cylindrical wall, and a second circular surface opposing said second cylindrical wall of said output retainer, and said radially extending portion of said output shaft including a first radially extending surface adjacent said first circular surface of said axially extending portion, and a second radially extending surface opposing said radially extending wall of said output retainer;

a ball bearing operatively disposed between said first cylindrical wall of said side cover and said first circular surface of said axially extending portion in abutting relationship with said first radially extending surface of said radially extending portion of said output shaft;

a radial needle bearing operatively disposed between said second cylindrical wall of said hollow axially extending portion of said output retainer and said second circular surface of said axially extending portion of said output shaft; and a thrust needle bearing operatively disposed between said radially extending wall of said output retainer and said radially extending surface of said radially extending portion, said first circular surface and said second circular surface of said axially extending portion of said output shaft being disposed on the opposite sides of said radially extending portion of said output shaft.

DESCRIPTION OF THE PREFERRED EMBODIMENT

Figure 1:
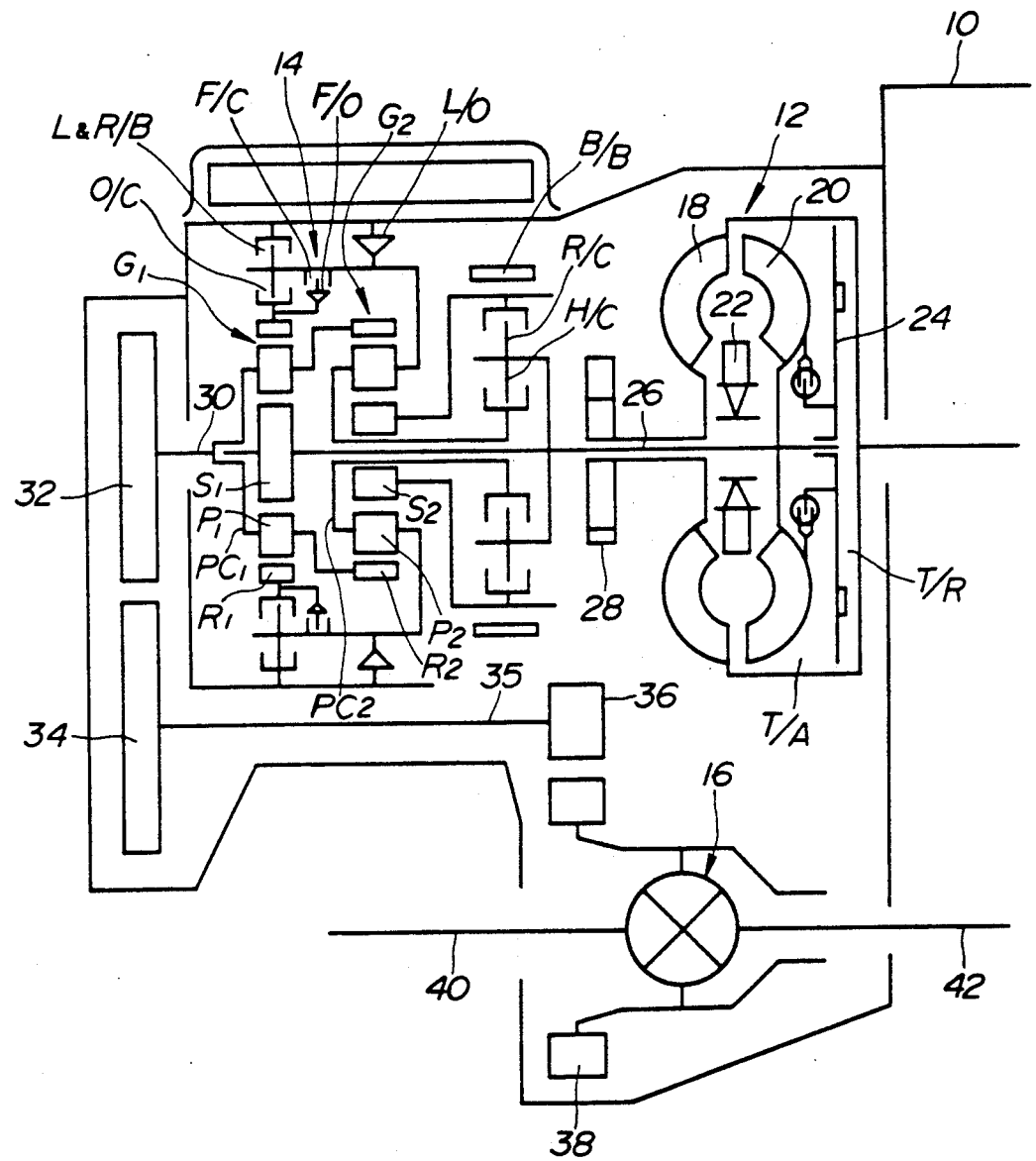
FIG. 1 is a diagrammatical illustration showing entire construction of the preferred embodiment of an automatic transaxle of FIG. 2.
Figure 2:
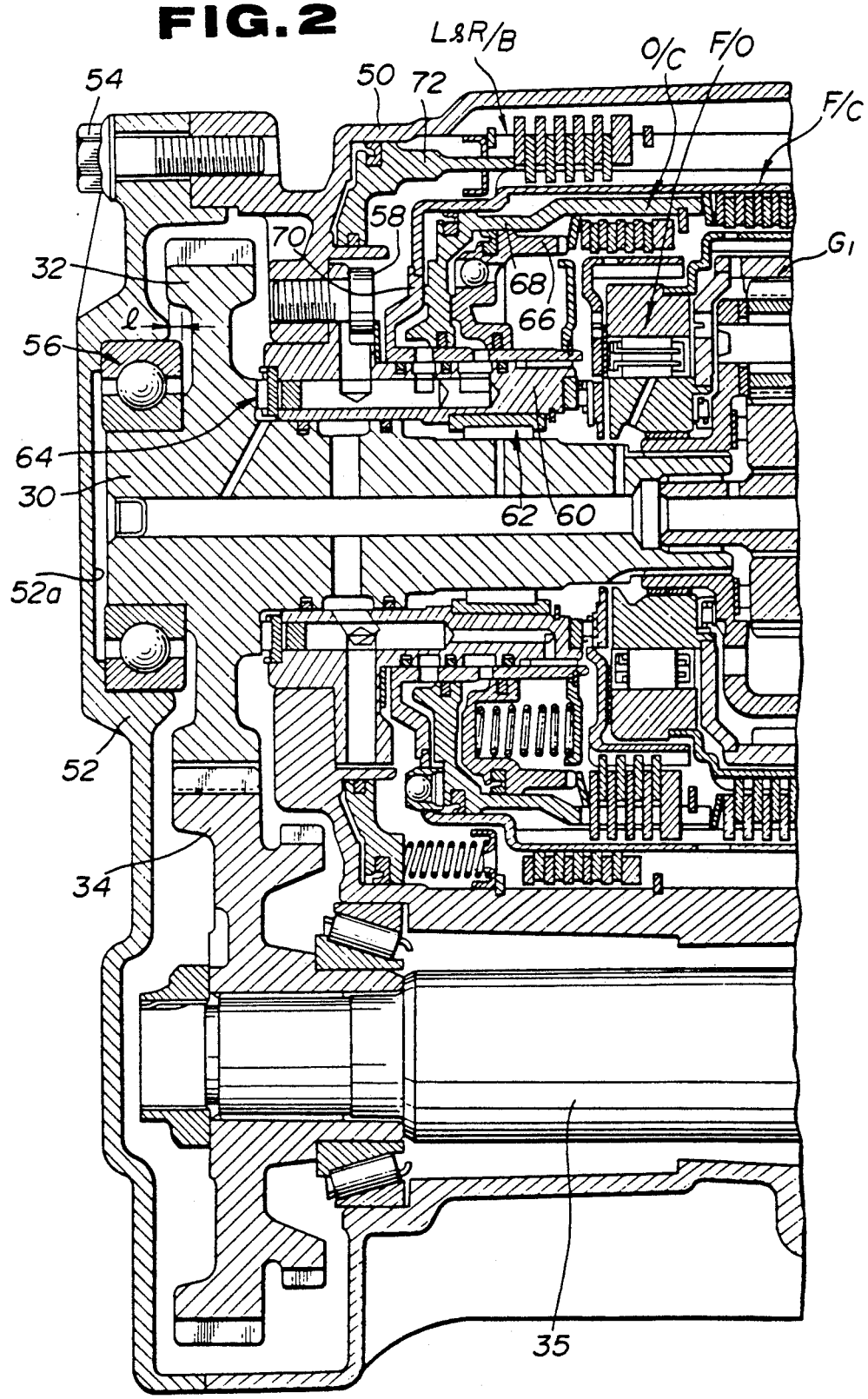
FIG. 2 is a section of the major part of the preferred embodiment of an automotive automatic transaxle according to the present invention.

Referring now to the drawing, FIGS. 1 and 2 illustrate the preferred embodiment of an automatic transaxle or power transmission for an automotive vehicle. In the shown embodiment, the automatic transaxle is designed for power transmission of an automotive internal combustion engine 10 which is transversely mounted on a vehicle body in relation to the vehicular longitudinal axis.

As shown in FIG. 1, the shown transaxle has a power transmission section including a torque converter 12 and a planetary gear mechanism 14 and so forth. The torque converter 12 includes a pump impeller 18, a turbine runner 20, a stator 22 and a lock-up clutch 24. The turbine runner 20 is connected to an input shaft 26. When the lock-up clutch 24 is held released position, an output torque of the engine 10 is transferred from the pump impeller 18 to the input shaft 26 via the working fluid. On the other hand, when the lock-up clutch 24 is engaged, the driving torque of the engine is mechanically transmitted to the input shaft 26. As is well known, the lock-up clutch 24 is controlled by pressure difference between an application chamber T/A and a release chamber T/R.

The torque converter 12 is designed for driving an oil pump 28.

The planetary gear mechanism 14 includes a first planetary gear assembly $G_1$ and a second planetary gear assembly $G_2$. The first planetary gear assembly $G_1$ comprises a first sun gear $S_1$, a first internal gear or ring gear $R_1$, pinion gears $P_1$ which engage with both of the first sun gear $S_1$ and the ring gear $R_1$, and a first pinion carrier $PC_1$. On the other hand, the second planetary gear assembly $G_2$ comprises a second sun gear $S_2$, a second internal gear or ring gear $R_2$, pinion gear $P_2$ which engage with both of the second sun gear $S_2$ and the ring gear $R_2$, and a second pinion carrier $PC_2$. The first sun gear $S_1$ is engaged to the input shaft 26 for rotation therewith. On the other hand, the first pinion carrier $PC_1$ and the second internal ring gear $R_2$ are constantly engaged with an output shaft 30. The first ring gear $R_1$ is engageable with the second pinion carrier $PC_2$ via a forward one-way clutch F/O and a forward clutch F/C, or in the alternative via an overrunning clutch O/C. The second sun gear $S_2$ is engageable with the input shaft 26 via a reverse clutch R/C. The second pinion carrier $PC_2$ is engageable with the input shaft 26 via a high clutch H/O. On the other hand, the second sun gear $S_2$ can be held stationary to a stationary section by means of a band brake B/B. The second pinion carrier $PC_2$ can also be held stationary to the stationary section by means of low one-way clutch L/O and a low and reverse brake L R/B which are arranged in parallel to each other. An output gear 32 is provided integral with the output shaft 30.

The output gear 32 engages with a counter gear 34 which is secured to a counter shaft 35. The counter shaft 35 firmly engages with a reduction gear 36 for rotation therewith. The reduction gear 36 engages with a ring gear 38 of a differential gear unit 16. Left and right drive shafts 40 and 42 extend from the differential gear unit 16. Since the shown embodiment takes the transverse engine mount layout for front engine, front wheel driver power train, the left and right drive shafts 40 and 42 are drivingly engaged with left and right front wheels (not shown).

As will be appreciated, the above-mentioned power train layout in the planetary gear mechanism 14 is controlled by means of the aforementioned clutches F/C, H/C, O/C, R/C, the brakes B/B, L R/B and one-way clutches F/O and L/O for controlling driving conditions of the gear elements $S_1$, $S_2$, $R_1$, $R_2$, $PC_1$ and $PC_2$. By controlling driving conditions of the gear elements set forth above, the rotation speed of the output shaft 30 in relation to the rotation speed of the input shaft 26 can be adjusted.

As will be appreciated, the shown embodiment of the automatic transaxle is designed for performing speed variation for 4 stage gear ratio in forward drive and single gear ratios stage in reverse drive. The relationship between the position of the transaxle elements and the established gear ratio will be shown in the appended table. In the table, sign "o" indicates that clutch and brake are applied, or, in the alternative, the one-way clutch is engaged. In the column of the band brake B/B, columns 2A, 3A and 4A respectively show pressure in second gear apply chamber 2A, third gear release chamber 3R and fourth gear apply chamber 4A, in which sign "o" represents that fluid pressure is supplied. $a_1$ and $a_2$ are ratio of number of gear teeth of the sun gears $S_1$ and $S_2$ versus the number of gear teeth of the internal gears $R_1$ and $R_2$. The gear ratio represents ratio of rotation speed of the output shaft 30 versus the rotation speed of the input shaft 26.

As is well known, the planetary gear mechanism 14 thus changes rotational speed input through the input shaft 26 at a desired rate to the output shaft 30. The rotation of the output shaft 30 is transmitted to a ring gear 38 of the differential gear mechanism 16 via the output gear 32, a counter gear 34 and a reduction gear 36. Thus, the drive shafts 40 and 42 are driven by the driving torque transmitted through the differential gear mechanism.

It should be appreciated that though the specific construction of the automatic transaxle is described hereinabove for facilitating general understanding about the automatic transaxle, the invention is not specified to be applied for the shown type of transaxle but can be applicable to any of different type automatic transaxles. Namely, though the shown embodiment is applied to the automatic transaxle which is coupled with the transversely mounted engine, it is applicable to the transaxle which is coupled with longitudinally mounted engine. Furthermore, although the disclosure specifically discloses the automatic transaxle for front engine, front wheel drive power train layout, the same construction of mounting structure for the output shaft, which will be discussed hereinbelow will be applicable to an automatic power transmission designed for any type of power trains, such as that for front engine, rear wheel drive layout.

FIG. 2 shows the major part of the preferred embodiment of the automatic transaxle, according to the present invention, in which the preferred construction of the mounting structure for the output shaft 30 is illustrated. As seen from FIG. 2, the transaxle comprises a housing 50 having an open axial end. The open end of the housing 50 is sealingly closed by a side cover 52 secured by means of bolts (only one is shown) 54. The side cover 52 is formed with an output shaft receptacle 52a. The output shaft receptacle 52a is formed into a generally cylindrical configuration and mounts a ball bearing assembly 56 on the inner periphery thereof. As seen from FIG. 2, the ball bearing assembly 56 is oriented in radially and inwardly shifted position with respect to the output gear 32 which is integrally formed with the output shaft 30 as set forth above, and in axially overlapping position to the output gear 32. The overlapping magnitude of the ball bearing assembly 56 and the output gear 32 is shown in FIG. 2 by l.

An output retainer 60 is secured within the housing 50 by means of bolts (only one is shown) 58. The output retainer 60 has a radial inner end opposing the outer periphery of the output shaft 30. A radial needle bearing assembly 62 is mounted on the radial inner end of the output retainer 60 so as to be disposed between the mating surfaces of the output retainer and the output shaft. The output retainer 60 also has a radially extending surface opposing a radially extending axial end of the output gear 32. A thrust needle bearing assembly 64 is mounted on the radially extending surface of the output retainer 60 and contacts with the mating surface on the radially extending axial end of the output gear 32.

The output retainer 60 further supports a clutch drum 70 for pistons 66 and 68 of the overrunning clutch O/C and the forward clutch F/C on the outer circumference. A piston 72 of the low and reverse clutch L R/C is positioned outside of the clutch drum 70.

With the construction set forth above, the output torque of the engine is transmitted to the torque converter 12 for rotatingly driving the latter. The driving torque is then transmitted through the power transmitting section including the planetary gear mechanism 14 to the output shaft 30. According to rotation of the output shaft 30, the output gear 32 is rotatingly driven for transmitting driving torque to the counter gear 34. The counter gear 34 drives the counter shaft 35 and thus drives the drive shafts 40 and 42 via the differential gear unit 16.

While power transmitting action set forth above, axial and radial force is exerted on the output shaft 30 due to reaction force input from the counter shaft 34 via the output shaft 32. Since the ball bearing assembly 56 is arranged in axially overlapping manner to the output gear 32 in the magnitude l, the most part of the radial component of the force exerted on the output shaft 30 is received by the ball bearing assembly 56. On the other hand, the axial thrusting force exerted on the output shaft 30 is received by the thrust needle bearing 64. As will be appreciated, the position of the thrust needle bearing 64 is so selected as to receive the axial thrusting force exerted in engine driving mode. The opposite direction of the thrusting force is exerted on the output shaft in engine braking mode. However, since the thrusting force generated in the engine braking mode is relatively small, the ball bearing 56 oriented opposite side of the thrust needle bearing 64 with respect to the output gear 32, can receive the thrusting force.

Therefore, as will be appreciated herefrom, the radial force to be exerted on the radial needle bearing 62 is maintained substantially small in any operation mode of the power train. Therefore, the capacity of receiving the radial force required for the radial needle bearing becomes substantially small. This allows the radial needle bearing to be of small diameter for reducing radial space required for installing the same.

Namely, utilizing of the small diameter radial needle bearing allows to reduce the radial size of the output retainer 60. Accordingly, the diameters of the clutch drum 70 can be reduced. Furthermore, with the reduced diameter, the sufficient effective areas of the pistons 66 and 68 can be provided. In addition, by employing the thrust needle bearing 64, axial size of the transaxle can be reduced.

Furthermore, frictional power loss in the combination of the ball bearing, the radial needle bearing and the thrust needle bearing is much smaller than that of the tapered needle bearing, efficiency of power transmission of the transaxle can be improved.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, while the radial needle bearing and the thrust needle bearing are mounted on the output retainer in the shown embodiment, either one or both can be mounted and supported on the transaxle housing 50.

TABLE

| | | | R/C | H/C | F/C | O/C | B/B 2A | 3A | 4A | L R/B | F/O | L/O | Gear RATIO | $\alpha_1 = 0.45$ $\alpha_2 = 0.45$ |
|---|---|---|---|---|---|---|---|---|---|---|---|---|---|---|
| D Range | Driving | 1st | | | o | | | | | | o | o | $\dfrac{1 + \alpha_1}{\alpha_1}$ | 3.22 |
| | | 2nd | | | o | | o | o | | | | | $\dfrac{\alpha_1 + \alpha_2 + \alpha_1 \cdot \alpha_2}{\alpha_1 (1 + \alpha_2)}$ | 1.69 |
| | | 3rd | o | o | | | o | o | | | | | 1 | 1 |
| | | 4th | o | | (o) | | o | o | o | | | | $\dfrac{1}{1 + \alpha_2}$ | 0.69 |
| | Braking | 1st | | | (o) | o | | | | | | | | |
| | | 2nd | | | (o) | o | o | | | | | | | |
| | | 3rd | o | | (o) | o | o | o | | | | | | |
| | | 4th | o | | (o) | | o | o | o | | | | | |
| 2 Range | | 1st | | | o | | | | | o | o | | | |
| | | 2nd | | | o | | o | o | | o | | | | |

| | | | | | B/B | | | | | | | $a1 = 0.45$ |
|---|---|---|---|---|---|---|---|---|---|---|---|---|
| | R/C | H/C | F/C | O/C | 2A | 3A | 4A | L R/B | F/O | L/O | Gear RATIO | $a2 = 0.45$ |
| 1 Range 1st | | | o | | | | | o | o | | | |
| Reverse | o | | | | .. | | | o | | | $-\dfrac{1}{a_2}$ | −2.22 |

What is claimed is:

1. In an automotive power transmission:
   a housing having an open axial end;
   a side cover secured to said housing to sealably close said open end of said housing, said side cover being formed with a generally cylindrical output shaft receptacle including a first cylindrical wall;
   an input shaft rotatably supported in said housing;
   an output shaft with an integral output gear;
   a gear mechanism mounted within said housing and operatively connected between said input shaft and said output shaft;
   an output retainer within said housing, said output retainer being secured to said housing and including an axially extending hollowed portion disposed radially inwardly of said gear mechanism, said axially extending hollowed portion including a radially extending wall and a second cylindrical wall,
   said output shaft including a radially extending portion formed with said output gear and disposed between said side cover and said radially extending wall of said output retainer, and an axially extending portion received in said generally cylindrical output shaft receptacle and received in said hollow axially extending portion of said output retainer,
   said axially extending portion of said output shaft including a first circular surface opposing said first cylindrical wall, and a second circular surface opposing said second cylindrical wall of said output retainer, and
   said radially extending portion of said output shaft including a first radially extending surface adjacent said first circular surface of said axially extending portion, and a second radially extending surface opposing said radially extending wall of said output retainer;
   a ball bearing operatively disposed between said first cylindrical wall of said side cover and said first circular surface of said axially extending portion in abutting relationship with said first radially extending surface of said radially extending portion of said output shaft;
   a radial needle bearing operatively disposed between said second cylindrical wall of said hollow axially extending portion of said output retainer and said second circular surface of said axially extending portion of said output shaft and having a smaller capacity for bearing a radial load than said ball bearing; and
   a thrust needle bearing operatively disposed between said radially extending wall of said output retainer and said radially extending surface of said radially extending portion,
   said first circular surface and said second circular surface of said axially extending portion of said output shaft being disposed on the opposite sides of said radially extending portion of said output shaft.

2. An automatic power transmission as claimed in claim 1 wherein said ball bearing is in abutting relationship with said side cover.

3. An automatic power transmission as claimed in claim 1 wherein said first radially extending surface is nearer said gear mechanism than the remote axial end of said output gear is.

4. An automatic power transmission as claimed in claim 3 wherein said gear mechanism includes a plurality of planetary gear sets.

* * * * *

UNITED STATES PATENT AND TRADEMARK OFFICE
CERTIFICATE OF CORRECTION

PATENT NO. : 5,087,231
DATED : February 11, 1992
INVENTOR(S) : YAMAGUCHI ET AL

It is certified that error appears in the above-indentified patent and that said Letters Patent is hereby corrected as shown below:

```
Line 5, change "trust" to --thrust--;
line 9, after "the" add --radial--;
line 11, after "required" add --to have--;
line 11, change "small" to --smaller--;
line 12, change "satisfactorily small for" to
--smaller in size--;
line 13, change "compact" to --more compactly--.
```

Signed and Sealed this

Twenty-sixth Day of October, 1993

Attest:

BRUCE LEHMAN

Attesting Officer          Commissioner of Patents and Trademarks